(12) United States Patent
Denk

(10) Patent No.: US 10,746,126 B2
(45) Date of Patent: Aug. 18, 2020

(54) ACTUATION OF FUEL INJECTORS FOR MULTIPLE INJECTIONS

(71) Applicant: CONTINENTAL AUTOMOTIVE GMBH, Hannover (DE)

(72) Inventor: Frank Denk, Obertraubling (DE)

(73) Assignee: Vitesco Technologies GmbH, Hannover (DE)

( * ) Notice: Subject to any disclaimer, the term of this patent is extended or adjusted under 35 U.S.C. 154(b) by 7 days.

(21) Appl. No.: 15/809,649

(22) Filed: Nov. 10, 2017

(65) Prior Publication Data

US 2018/0080406 A1 Mar. 22, 2018

Related U.S. Application Data

(63) Continuation of application No. PCT/EP2016/058178, filed on Apr. 14, 2016.

(30) Foreign Application Priority Data

May 26, 2015 (DE) .......... 10 2015 209 566

(51) Int. Cl.
*F02D 41/00* (2006.01)
*F02D 41/40* (2006.01)
*F02D 41/20* (2006.01)

(52) U.S. Cl.
CPC .......... *F02D 41/402* (2013.01); *F02D 41/20* (2013.01); *F02D 2041/2003* (2013.01);
(Continued)

(58) Field of Classification Search
CPC ............. F02D 41/20; F02D 2041/2051; F02D 2041/2058; F02D 2041/2041; F02D 2041/2003; Y02T 10/44
See application file for complete search history.

(56) References Cited

U.S. PATENT DOCUMENTS 5,995,356 A 11/1999 Glavmo et al.
9,982,616 B2 * 5/2018 Imai .................. F02D 41/20
(Continued)

FOREIGN PATENT DOCUMENTS

CN 104685192 A 6/2015
DE 10138483 A1 2/2003
(Continued)

OTHER PUBLICATIONS

International Search Report and Written Opinion dated Jul. 7, 2016 from corresponding International Patent Application No. PCT/EP2016/058178.
(Continued)

*Primary Examiner* — Phutthiwat Wongwian
*Assistant Examiner* — Sherman D Manley

(57) ABSTRACT

A method for actuating a fuel injector having a magnetic coil drive for an internal combustion engine of a motor vehicle is disclosed. The fuel injector has a first terminal and a second terminal, where the first terminal is connectable via a switch element to ground and the second terminal is connected to ground. The method includes the following: actuating the switch element to connect the first terminal to ground, acquiring a time curve of the current strength of a current flowing through the magnetic coil drive, and applying a voltage pulse to the magnetic coil drive to initiate an opening procedure of the fuel injection. A duration of the voltage pulse is established as a function of the acquired time curve of the current strength. Furthermore, an engine controller and a computer program are described.

13 Claims, 2 Drawing Sheets

(52) U.S. Cl.
CPC .............. *F02D 2041/2041* (2013.01); *F02D 2041/2044* (2013.01); *F02D 2041/2051* (2013.01); *F02D 2041/2058* (2013.01); *Y02T 10/44* (2013.01)

(56) References Cited

U.S. PATENT DOCUMENTS

| | | | |
|---|---|---|---|
| 2001/0027780 A1 | 10/2001 | Rueger et al. | |
| 2009/0107469 A1* | 4/2009 | Takahashi | F02D 41/20 123/490 |
| 2009/0177369 A1* | 7/2009 | Miyake | F02D 41/20 701/105 |
| 2010/0263632 A1* | 10/2010 | Miyake | F02D 41/20 123/476 |
| 2012/0097133 A1* | 4/2012 | Beer | F02D 41/20 123/490 |
| 2014/0069391 A1* | 3/2014 | Nishimura | F02D 41/20 123/478 |
| 2014/0124601 A1* | 5/2014 | Imai | F02D 41/20 239/585.1 |
| 2017/0191437 A1* | 7/2017 | Yanoto | F02D 41/20 |
| 2017/0226950 A1* | 8/2017 | Tanaka | F02D 41/20 |
| 2018/0230932 A1* | 8/2018 | Hauser | F02D 41/2467 |

FOREIGN PATENT DOCUMENTS

| | | |
|---|---|---|
| DE | 102012213883 A1 | 2/2014 |
| DE | 102012222864 A1 | 6/2014 |
| DE | 102013207152 A1 | 10/2014 |
| EP | 0570986 A2 | 11/1993 |
| EP | 2083159 A1 | 7/2009 |
| JP | 6101552 A | 11/2014 |
| WO | 2011023476 A1 | 3/2011 |

OTHER PUBLICATIONS

German Office Action dated Feb. 4, 2016 for corresponding German Patent Application No. 10 2015 209 566.5.
Notice of Allowance dated Mar. 12, 2019 for corresponding Korean Application No. 10-2017-7033720.
Chinese First Office Action dated Mar. 23, 2020 for the counterpart Chinese Patent Application No. 201680030198.5.

* cited by examiner

ACTUATION OF FUEL INJECTORS FOR MULTIPLE INJECTIONS

CROSS-REFERENCE TO RELATED APPLICATIONS

This application claims the benefit of International application No. PCT/EP2016/058178, filed Apr. 14, 2016, which claims priority to German application No. 10 2015 209 566.5, filed May 26, 2015, each of which is hereby incorporated by reference.

TECHNICAL FIELD

The present disclosure relates to the actuation of fuel injectors, in particular a method for actuating a fuel injector having a magnetic coil drive for an internal combustion engine of a motor vehicle. Furthermore, the present disclosure relates to an engine controller and a computer program.

BACKGROUND

When operating fuel injectors having a magnetic coil drive, different chronological opening behaviors of the individual injectors and therefore variations in the respective injection quantity occur because of electrical tolerances.

The relative injection quantity differences from injector to injector and from injection to injection increase as injection times and/or electrical/hydraulic separation times become shorter. These relative quantity differences have heretofore been small and without practical significance. The development in the direction of smaller and more injection quantities and injection times per injection cycle (multiple injections) has had the result that the influence of the relative quantity differences can no longer be left out of consideration. In particular in the case of injections in short succession, a residual magnetization present in the magnetic coil drive can be present from the preceding injection, which can influence the following injection.

In some examples, the injector voltage of the last injection procedure is ascertained before a next injection to conclude a pre-magnetization state of the injector and react in a suitable manner. Furthermore, this alternatively may be carried out by a defined supply voltage and the flowing current linked thereto be obtained as a measure of a residual magnetization.

SUMMARY

The present disclosure provides an improved and simple actuation of fuel injectors, which allows multiple injections with high precision.

One aspect of the disclosure provides a method for actuating a fuel injector. The fuel injector includes a magnetic coil drive for an internal combustion engine of a motor vehicle. The fuel injector includes a first terminal and a second terminal, where the first terminal is connectable via a switch element to ground and the second terminal is connected to ground. The method includes: (a) actuating the switch element to connect the first terminal to ground; (b) acquiring a time curve of the current strength of a current flowing through the magnetic coil drive; and (c) applying a voltage pulse to the magnetic coil drive to initiate an opening procedure of the fuel injector, where a duration of the voltage pulse is established as a function of the acquired time curve of the current strength.

The described method is based on the finding that a connection of the two terminals of the fuel injector to ground, when a residual magnetization is present, causes a current flow in the coil of the magnetic coil drive. This current flow depends on the residual magnetization present and is therefore relevant to it. If residual magnetization is present, the decaying eddy currents linked thereto and the decaying magnetic flux thereof due to induction and the end of freewheeling of the terminals cause a current flow in the main winding of the magnetic coil drive. By acquiring the time curve of the current flow (during a short measuring phase before the actual actuation of the fuel injector), the starting state of the fuel injector with respect to residual magnetization can therefore be acquired, taken into consideration during the subsequent actuation, and a precise injection quantity can be achieved.

In other words, both terminals of the fuel injector are connected to ground (i.e., a reference potential) during a measuring phase preceding the actual actuation. The current running in the magnetic coil drive in this freewheel state is acquired and the time curve is stored, for example, in the form of a series of sampling values. After this measuring phase, the actual actuation of the fuel injector follows, to open it. In this case, a voltage pulse, for example, a so-called boost voltage pulse having significantly increased voltage in relation to the vehicle electrical system voltage, is applied to the magnetic coil drive. The duration of this voltage pulse is established as a function of the acquired time curve of the current strength. For example, if it is established that a certain residual magnetization is provided, the duration of the voltage pulse can be shortened in comparison to the case where no residual magnetization is present.

The duration of the measuring phase is very short relative to the duration of the subsequent boost phase, for example, between 5% and 20%. In the case of multiple injections, the measuring phase can therefore be inserted during the pause between two successive injections, without occupying additional time for this purpose.

The coil current flowing during the short measuring phase also forms a magnetic field and therefore enables a spatially modified dissipation of the residual magnetization, which can be used for the subsequent injection procedure. It is known that in the case of electromagnetic injectors having conductive magnetic material, at the beginning and at the end of the energizing, the magnetic flux required for the force builds up and dissipates in a delayed manner because of the eddy current activity in the case of a cylindrical construction. At the beginning of the energizing, the flux permeates from the outside toward the inside. At the end of the energizing, the flux dissipates from the outside toward the inside. The measuring process causes a spatial reconfiguration of the flux dissipation. The newly measurable coil current generates a new flux buildup from the outside toward the inside, which causes a spatial flux distribution at the beginning of energizing and can therefore be used in an advantageous form in the case of a multiple injection (similarity principle).

Overall, a precise consideration of the residual magnetization is enabled by a short-term current measurement without additional energy supply.

In some implementations, the second terminal is connected to ground by a diode. The diode substantially corresponds to the freewheel diode provided in many fuel injector control circuits, which is connected so that a circuit having the fuel injector coil is closed in a low-ohmic manner during the measuring phase.

In some examples, the voltage pulse is ended at a time at which the current strength of the current flowing through the magnetic coil drive reaches a defined value. In other words, the duration of the voltage pulse is controlled as a function of reaching a defined current value (also called peak current).

In some implementations, the defined value is established as a function of the acquired time curve of the current strength. In other words, the precise value of the current strength at which the boost voltage pulse is ended is established based on the time curve of the current strength acquired during the measuring phase. In short, the peak current and therefore the duration of the boost phase is set as a function of the measured current curve.

In some examples, the switch element has a transistor. The transistor may be a so-called low-side transistor.

In some implementations, a slope and/or an amplitude of the current strength is/are taken into consideration when establishing the duration of the voltage pulse. It is qualitatively recognizable that the level of the measurable current is proportional in relation to the residual magnetization present, which also applies to the number of turns. The curve is determined by the electromagnetic time constant, which is dependent on the geometry of the injector and its total magnetic resistance.

The adaptation of the duration of the voltage pulse and/or the peak current may furthermore take into consideration physical system parameters, for example, fuel temperature, magnetic coil temperature, distance from the preceding injection procedure, etc. This can be performed, for example, by using corresponding pilot characteristic curves or characteristic maps or a model.

Another aspect of the disclosure provides an engine controller for a vehicle, which is configured to use a method according to the above description. This engine controller enables a very high precision to be ensured during multiple injections, i.e., injections in short succession, in a simple manner.

Another aspect of the disclosure provides a computer program, which is configured, when it is executed by a processor, to carry out the method according to the above description.

For the purposes of this document, a computer program is equivalent to the concept of a program element, a computer program product, and/or a computer-readable medium, which contains instructions for controlling a computer system to coordinate the operating mode of a system or a method in a suitable manner, in order to achieve the effects linked to the method according to the disclosure.

The computer program may be implemented as computer-readable instruction code in any suitable programming language, for example, in Java, C++, etc. The computer program may be stored on a computer-readable storage medium (CD-ROM, DVD, Blu-ray disk, removable drive, volatile or non-volatile memory, installed memory/processor, etc.). The instruction code may program a computer or other programmable devices, such as a control unit for an engine of a motor vehicle in particular, such that the desired functions are executed. Furthermore, the computer program may be provided in a network, for example, the Internet, from which it can be downloaded by a user as needed.

The disclosure may be implemented both by means of a computer program, i.e., software, and also by means of one or more special electrical circuits, i.e., in hardware, or in any arbitrary hybrid form, i.e., by means of software components and hardware components.

It is to be noted that implementations and examples of the disclosure were described with reference to different subjects of the disclosure. In particular, some implementations and examples of the disclosure are described by method claims and other implementations and examples of the disclosure are described by device claims. However, it will be immediately clear to a person skilled in the art upon reading this application that, if not explicitly indicated otherwise, in addition to a combination of features which are associated with one type of subject matter of the disclosure, an arbitrary combination of features which are associated with different types of subjects of the disclosure is also possible.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
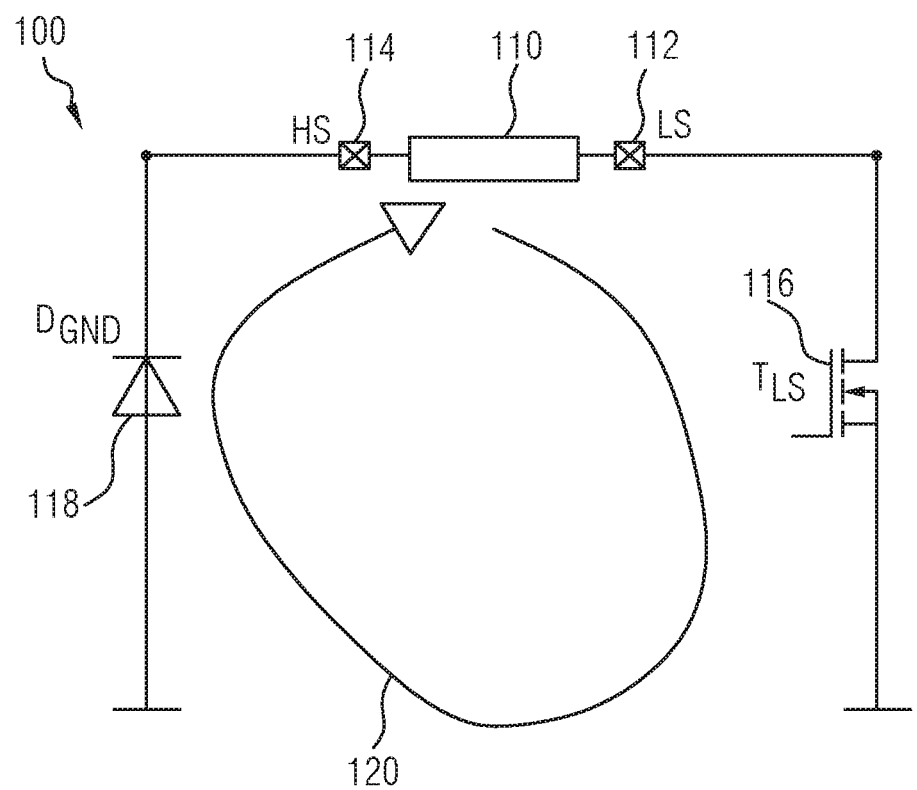
FIG. 1 shows a circuit diagram of a part of a circuit for actuating a fuel injector.

FIG. 1 shows a circuit diagram 100 of a part of a circuit for actuating a fuel injector 110. The fuel injector 110 has terminals 112 (low-side LS) and 114 (high-side HS). The terminal 112 is connected to a transistor 116 (low-side transistor TLS) and thus is connectable to ground. The terminal 114 is connected by a diode 118 (freewheel diode DGND) to ground.

Figure 2:
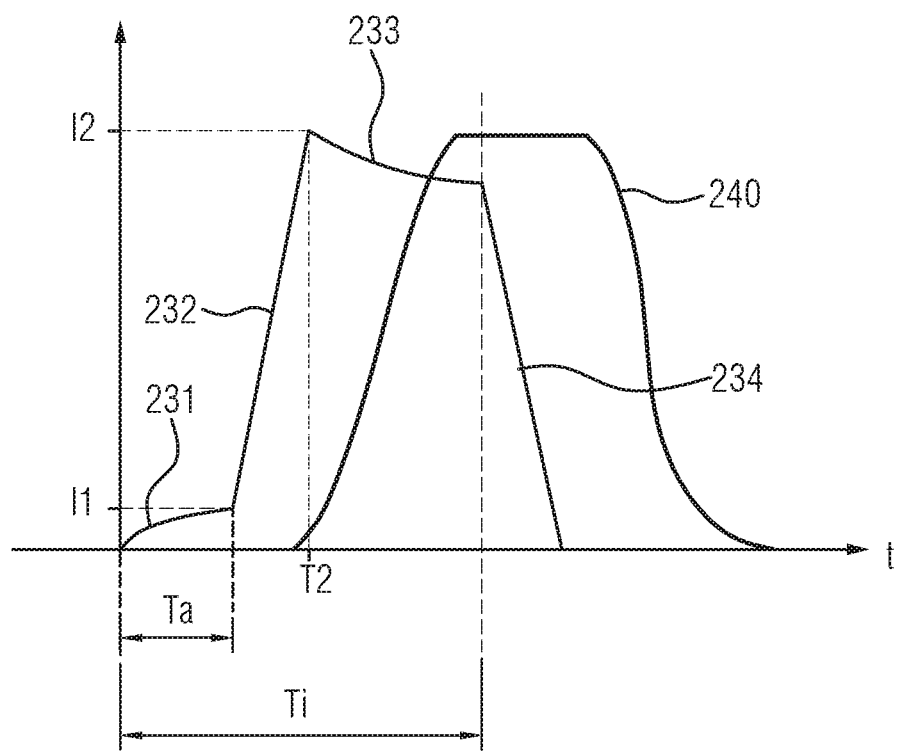
FIG. 2 shows a graph of an exemplary current curve according to the disclosure.

FIG. 2 shows a graph 201 of an exemplary time current curve 231-234. The illustration 201 furthermore shows the time curve 240 of a fuel quantity introduction.

The actuation of the fuel injector according to the disclosure will be explained hereafter with reference to FIGS. 1 and 2. In operation, the transistor 116 is actuated so that the terminal 112 is connected to ground. If a residual magnetization is present in the fuel injector 110, a current 231 will now flow through the fuel injector 110, as shown by the arrow 120. This current 231 is acquired over a relatively short time interval Ta of approximately 50-100 μs (measuring phase) and analyzed to ascertain the magnetization state of the fuel injector 110.

After the measuring phase Ta, an increased voltage (boost voltage) is switched on at the terminal 114, to initiate the opening procedure of the fuel injector 110. The duration of this voltage pulse is established as a function of the ascertained magnetization state, so that the residual magnetization is taken into consideration if necessary and the predefined injection quantity is achieved. This duration is established indirectly, for example, by using a dynamic peak current value I2. In this case, the current 232 flowing through the magnetic coil drive is measured and when it reaches the given peak current value I2 at time T2, the voltage at the terminal 114 is switched down to a lower voltage (so-called holding voltage), so that the fuel injector 110 remains open for a defined time. The peak current value I2 is established as a function of the current 231 measured during the measuring phase. The slope and/or the maximum value I1 of the measured current 231 is used to establish the peak current value I2 in particular here.

After the time T2, the coil current 233 drops somewhat during the holding phase and the coil current 234 drops steeply after switching off the holding voltage.

The curve 240 shows the profile of the fuel injection quantity per unit of time. The fuel quantity injection rate begins to increase shortly before the time T2 and reaches a maximum value shortly before the end of the holding phase, which is maintained for some time. The fuel quantity injection rate 240 drops again thereafter.

Overall, a residual magnetization which originates, for example, from an injection procedure carried out shortly beforehand and is not yet dissipated is taken into consideration during the following injection according to the disclosure, to achieve a precise injection quantity.

A number of implementations have been described. Nevertheless, it will be understood that various modifications may be made without departing from the spirit and scope of the disclosure. Accordingly, other implementations are within the scope of the following claims.

What is claimed is:

1. A method for actuating a fuel injector for an internal combustion engine of a motor vehicle, the fuel injector comprising a magnetic coil drive, a first terminal and a second terminal, the first terminal is connectable via a switch element to ground and the second terminal is connected to ground via a freewheel diode, the method comprising:
   prior to coupling the magnetic coil drive to a voltage supply at a beginning of an opening procedure of the fuel injector during which the fuel injector is opened, actuating the switch element to connect the first terminal to ground while the second terminal is connected to ground during a freewheel state of the magnetic coil drive in which current from a residual magnetization in the magnetic coil drive passes through the freewheel diode and into the second terminal;
   during the time the switch element is actuated and the second terminal is connected to ground during the freewheel state of the magnetic coil drive, measuring the current and creating a time curve of the current strength of the current from the residual magnetization in the magnetic coil drive flowing through the magnetic coil drive;
   at a completion of the time the switch element is actuated and the second terminal is connected to ground during the freewheel state of the magnetic coil drive, applying a voltage pulse to the magnetic coil drive to begin the opening procedure of the fuel injector; and
   establishing a duration of the voltage pulse as a function of the time curve of the current strength from the residual magnetization in the magnetic coil drive,
   wherein the residual magnetization in the magnetic coil drive flowing through the magnetic coil drive is due at least in part to a preceding actuation of the fuel injector.

2. The method of claim 1, wherein the voltage pulse is ended at a time at which the current strength of the current flowing through the magnetic coil drive reaches a defined value.

3. The method of claim 2, wherein the defined value is established as a function of the time curve of the current strength of the current from the residual magnetization in the magnetic coil drive, and the duration of the voltage pulse is established at least in part by the defined value being established.

4. The method of claim 1, wherein the switch element includes a transistor.

5. The method of claim 1, wherein establishing the duration of the voltage pulse comprises determining the duration based upon a slope of the current strength of the current from the residual magnetization in the magnetic coil drive during the time the switch element is actuated and the second terminal is connected to ground.

6. An engine controller for a vehicle which is configured to use a method for actuating a fuel injector for an internal combustion engine of a motor vehicle, the fuel injector comprising a magnetic coil drive, a first terminal and a second terminal, the first terminal is connectable via a switch element to ground and the second terminal is connected to ground via a freewheel diode, the method comprising:
   prior to coupling the magnetic coil drive to a voltage supply at a beginning of an opening procedure during which the fuel injector is opened, actuating the switch element to connect the first terminal to ground while the second terminal is connected to ground during a freewheel state of the magnetic coil drive in which current from a residual magnetization in the magnetic coil drive flows through the freewheel diode and into the second terminal;
   during the time the switch is actuated and the second terminal is connected to ground and during the freewheel state of the magnetic coil drive, acquiring measuring the current and creating a time curve of the current strength of the current from the residual magnetization of the magnetic coil drive flowing through the magnetic coil drive; and
   at a completion of the time the switch element is actuated and the second terminal is connected to ground when the magnetic coil drive is in the freewheel state, applying a voltage pulse to the magnetic coil drive to begin the opening procedure of the fuel injector,
   wherein a duration of the voltage pulse is established as a function of the time curve of the current strength from the residual magnetization of the magnetic coil drive.

7. A computer program, which is stored in non-transitory memory and configured, when it is executed by a processor, to carry out a method for actuating a fuel injector for an internal combustion engine of a motor vehicle, the fuel injector comprising a magnetic coil drive, a first terminal and a second terminal, the first terminal is connectable via a switch element to ground and the second terminal is connected to ground via a freewheel diode, the method comprising:
   prior to coupling the magnetic coil drive to a voltage supply at a beginning of an opening procedure during which the fuel injector is opened, actuating the switch element to connect the first terminal to ground while the second terminal is connected to ground during a first state of the magnetic coil drive in which current from a residual magnetization in the magnetic coil drive flows through the freewheel diode and into the second terminal;
   during the time the switch element is actuated and the second terminal is connected to ground during the first state of the magnetic coil drive, measuring the current and creating a time curve of the current strength of the current from the residual magnetization of the magnetic coil drive flowing through the magnetic coil drive; and
   at a completion of the time when the switch element is actuated and the second terminal is connected to ground when the magnetic coil drive is in the first state, applying a voltage pulse to the magnetic coil drive to initiate an opening procedure of the fuel injector, wherein a duration of the voltage pulse is established as a function of the time curve of the current strength from the residual magnetization of the magnetic coil drive.

8. The engine controller of claim 6, wherein the voltage pulse ends at a time at which the current strength of the current flowing through the magnetic coil drive reaches a defined value.

9. The engine controller of claim 8, wherein the engine controller is configured to determine the defined value as a function of the time curve of the current strength of the current from the residual magnetization in the magnetic coil drive, and the duration of the voltage pulse is established at least in part by the defined value being established.

10. The engine controller of claim 6, wherein the engine controller establishes the duration of the voltage pulse based upon a slope of the current strength of the current from the residual magnetization in the magnetic coil drive during the time the switch element is actuated and the second terminal is connected to ground.

11. The computer program of claim 7, wherein the voltage pulse ends at a time at which the current strength of the current flowing through the magnetic coil drive reaches a defined value.

12. The computer program of claim 11, wherein the computer program, when executed by the processor, determines the defined value as a function of the time curve of the current strength of the current from the residual magnetization in the magnetic coil drive, and the duration of the voltage pulse is established at least in part by the defined value being established.

13. The computer program of claim 7, wherein the computer program, when executed by the processor, establishes the duration of the voltage pulse based upon a slope of the current strength of the current from the residual magnetization in the magnetic coil drive during the time the switch element is actuated and the second terminal is connected to ground.

* * * * *